(12) United States Patent
Winkler (10) Patent No.: US 7,820,313 B2
(45) Date of Patent: Oct. 26, 2010

(54) FUEL SOURCE RECOGNITION AND GATING APPARATUS AND ASSOCIATED METHOD

(75) Inventor: David Winkler, Spring Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 1059 days.

(21) Appl. No.: 11/537,683

(22) Filed: Oct. 2, 2006

(65) Prior Publication Data

US 2008/0081234 A1    Apr. 3, 2008

(51) Int. Cl.
*B65B 3/04*    (2006.01)
*H01M 2/04*    (2006.01)

(52) U.S. Cl. .............................. 429/22; 429/12; 429/34; 141/94; 141/98; 141/370

(58) Field of Classification Search .................... 141/94, 141/98, 369–370; 429/12, 22, 34
See application file for complete search history.

(56) References Cited

U.S. PATENT DOCUMENTS

| 7,171,989 B2 * | 2/2007 | Corless et al. ................. 141/2 |
| 7,642,742 B2 * | 1/2010 | Curello et al. .............. 320/101 |
| 7,729,960 B2 * | 6/2010 | Suzuki ....................... 141/94 |
| 2004/0265671 A1 * | 12/2004 | Chipchase et al. ............ 429/34 |
| 2005/0040951 A1 | 2/2005 | Zalewski et al. |
| 2005/0074656 A1 * | 4/2005 | Koyama et al. ................ 429/34 |
| 2006/0008687 A1 * | 1/2006 | Kaye et al. ..................... 429/20 |
| 2006/0019135 A1 | 1/2006 | Curello et al. |
| 2006/0222913 A1 * | 10/2006 | Suzuki ........................ 429/22 |
| 2008/0077802 A1 * | 3/2008 | Richardson et al. ........... 429/22 |
| 2008/0145739 A1 * | 6/2008 | Adams et al. ................. 429/34 |

* cited by examiner

*Primary Examiner*—Gregory L Huson
*Assistant Examiner*—Nicolas A Arnett
(74) *Attorney, Agent, or Firm*—Gary J. Cunningham; Philip H. Burrus, IV (57) ABSTRACT

A gating device (100) and associated method (900) for identifying a fuel container (101) used to refill a fuel cell (102) are presented. A fuel source identification device (103) identifies a fuel container (101) to verify that it is compatible with the fuel cell (102). Upon identification, a gating engine (105) opens a retractable barrier (106), thereby providing access to the fuel cell (102). The gating engine (105) moves the retractable barrier (106) from a closed position to an open position when a control circuit (803) indicates that the fuel container (101) is compatible with the fuel cell (102). The fuel container identification device may be an impedance detector (201), a connectivity detector (301), a barcode reader (401), a memory reader (501), a radio-frequency identification device (601), a label reader (701), or other similar device.

14 Claims, 5 Drawing Sheets

FUEL SOURCE RECOGNITION AND GATING APPARATUS AND ASSOCIATED METHOD

BACKGROUND

1. Technical Field

This invention relates generally to a device for identifying a fuel source, and upon identification allowing the fuel source access to an electronic device, and more specifically to a method and apparatus for recognizing a fuel source container, and upon recognition, opening a barrier to provide access to a fuel cell fuel input.

2. Background Art

Mobile electronic devices are becoming more commonplace in society. As their popularity increases, so too does the need for more efficient power sources. Traditionally, batteries have been the sole source of power for mobile devices. Batteries convert chemicals stored therein into electrical energy. This process continues until all the stored energy is depleted, and then the battery is either discarded or recharged.

One of the most common applications for batteries in today's world is in powering portable electronic devices such as mobile phones. In the past, mobile phones were only used for voice communications, allowing a single battery to reliably power a mobile phone for an extended amount of time. As mobile phone technology increases, allowing users to perform more functions than ever before, such as watching video content, the power requirement for these devices also increases. Today's most technologically advanced mobile phones can drain a battery in a single day. Consequently, users must recharge their phone more often to avoid inconveniences such as dead batteries or dropped calls.

One proposed solution to this problem is combining a battery with a fuel cell in an electronic device. A fuel cell produces electrical energy by converting hydrogen and oxygen into water, thereby releasing electrons. As long as the fuel cell has access to hydrogen and oxygen, the fuel cell will continue to generate power. Because oxygen is readily available in our environment, the only obstacle in fuel cell implementation is supplying a source of hydrogen. Hydrogen is very hard to store and transport, which limits its use with mobile devices.

One solution to this storage and transportation problem is to use a "reformer" in the fuel cell. A reformer converts more common and more easily accessible gases, such as methanol, ethanol and natural gases, into the hydrogen the fuel cell needs to operate. These conversions and chemical processes occur within the fuel cell. The fuel used to "refill" the fuel cell, when it depletes its hydrogen source, generally comes from a container that can be attached to the fuel cell.

One problem associated with fuel containers is the fact that there are many different fuel sources available for supplying a fuel cell with a source of hydrogen. Different electronic device manufactures may use different types of fuel cells, and thus different types of fuel, in their devices. For example some may elect to use methanol, while others may use ethanol. Because not all fuel cells are alike, the fuel used to refill them must be tailored specifically to match the fuel cell. If a fuel cell using a first source of hydrogen, for example methanol, was refilled with a fuel source distributing a second source of hydrogen, for example ethanol, the fuel cell may not produce electricity as effectively as if it had been refilled with the proper source of hydrogen.

There is a need for a method and apparatus to prevent a device using a fuel cell from being contaminated with non-compatible fuel.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to identification of a fuel container, and upon identification, permitting the fuel container to be used with an electronic device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." In this document, relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Fuel cells are an up and coming energy source for mobile devices. To protect the fuel cell from unapproved suppliers' containers, or otherwise incompatible fuels, described and illustrated herein is a method and apparatus for using a retractable barrier to prevent a fuel container from being inserted fully into an electronic device until its identity can be determined. If the container is identified as being compatible, for example where the container is from an approved supplier, the retractable barrier is opened. The fuel container can now be fully inserted into device, allowing the dispensing of fuel.

To assist in describing and illustrating embodiments of the invention, mobile telephones will be used herein as exemplary electronic devices. However, it will be clear to those of ordinary skill in the art having the benefit of this disclosure that other electronic devices will be compatible with a gating device as illustrated and described herein. Additionally, liquid fueled devices, such as devices employing an engine that is operational from a liquid fuel source, hybrid devices, such as devices having a fuel cell and battery power source, and other devices may employ the gating device of the present invention.

Figure 1:
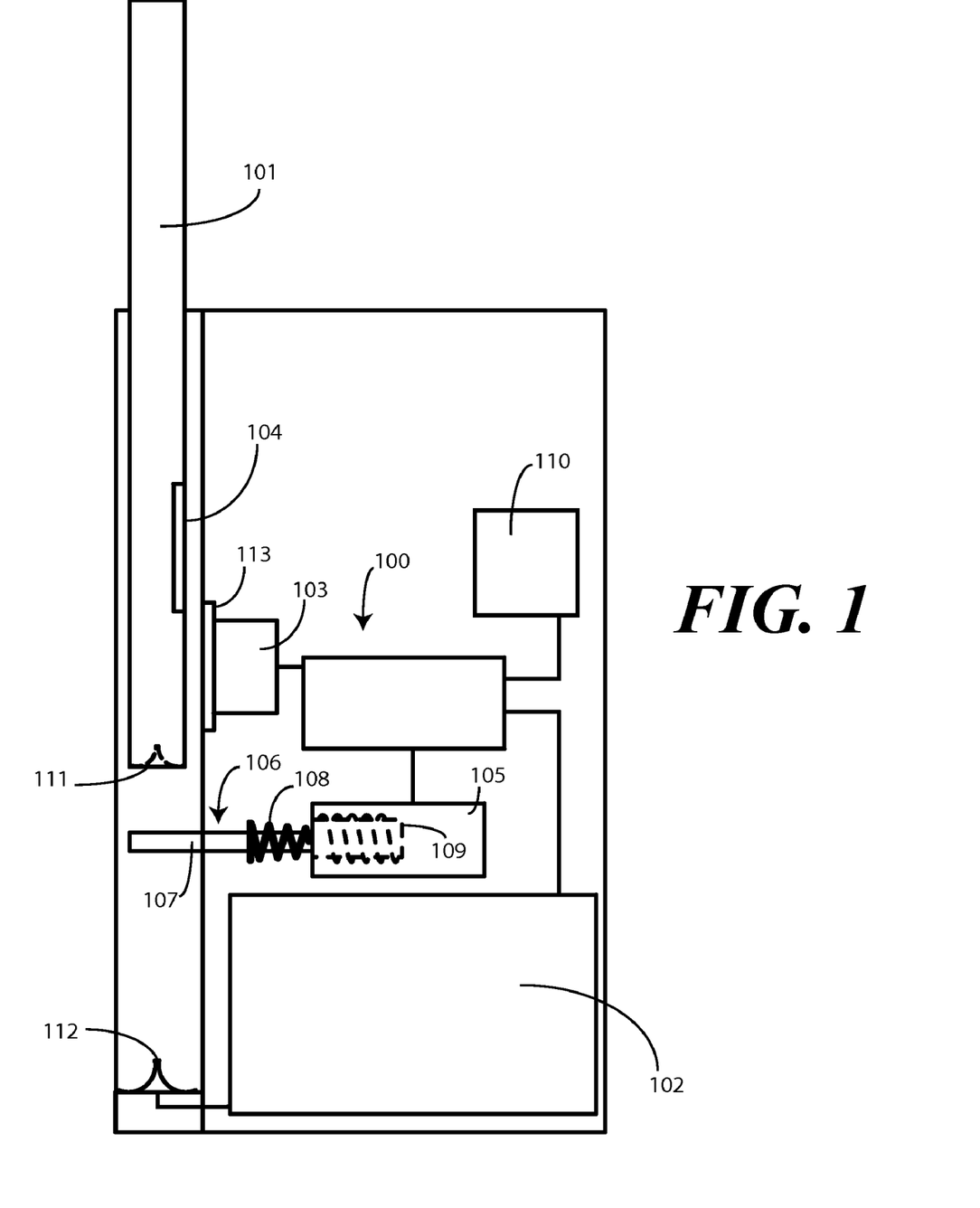
FIG. 1 illustrates one embodiment of a gating device.

Turning now to FIG. 1, illustrated therein is one embodiment of a gating device 100 for controlling coupling of a fuel container 101 with a fuel cell 102. The gating device 100 comprises a fuel container identification device 103 having an identification sensor 113 coupled thereto. The fuel container identification device 103 is configured to read, scan, or otherwise identify the fuel container identification 104 located on the fuel container 101. A gating engine 105, powered in one embodiment by a battery 110, is coupled to the fuel container identification device 103. In one embodiment, the fuel container identification device 103 recognizes the fuel container 101 by reading, scanning, or otherwise detecting indicia on the fuel container identification 104. Upon identification, the gating engine 105 opens a retractable barrier 106, thereby allowing the fuel container 101 to engage a fuel input 112.

The retractable barrier 106 prevents a fuel container coupling 111 connected to the fuel container 101 from accessing a fuel input 112 connected to the fuel cell 102. In one embodiment of the invention, the retractable barrier 106 comprises a sliding partition 107. Regarding the retractable barrier 106, it will be clear to those of ordinary skill in the art having the benefit of this disclosure that the invention is not so limited. Other barriers, including rotating shutters, pivoting partitions, cat's eye shutters, and the like may also control the coupling of the fuel container 101 with the fuel cell 102.

In one embodiment of the invention, the sliding partition 107 is loaded with a spring 108 so as to be disposed in a closed position when the gating engine 105 is inactive. By loading the sliding partition 107 with the spring 108 in such a manner, the gating engine 105 does not need to constantly exert energy in closing the sliding partition 107. The gating engine 105 only needs to exert energy when opening the sliding partition 107. The gating engine 105, may additionally include an electromechanical solenoid 109, used to open the sliding partition 107. Regarding the gating engine 105, it will be clear to those of ordinary skill in the art having the benefit of this disclosure that the invention is not limited to the use of solenoid devices. Other gating engines, including pneumatic solenoids, hydraulic solenoids, electric motors, and the like may also be used to open the sliding partition 107.

Turning now to FIGS. 2-7, illustrated therein are embodiments of identification sensors 213,313,413,513,613,713 suitable for use with a fuel container identification device (103) in accordance with the invention. Beginning with FIG. 2, one embodiment of an identification sensor 213 comprises an impedance detector 201. As described in U.S. Pat. No. 5,506,490 to DeMuro, issued Apr. 9, 1996, entitled "Method and apparatus for determining external power supply type," an impedance detector may be used to identify a certain kind of a device using a voltage divider circuit. The voltage generated by a resistor divider network including a pull-up resistor and a pull-down resistor may be used to identify a power source.

Figure 2:
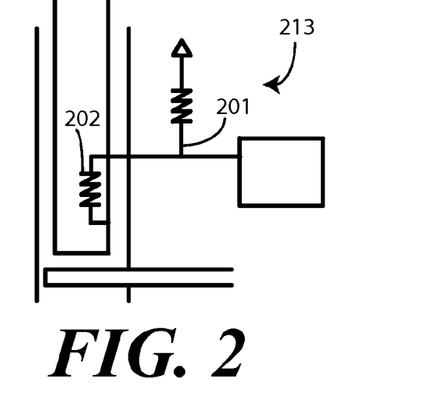
FIG. 2 illustrates one embodiment of an identification sensor comprising an impedance detector.

In one embodiment, the impedance detector 201 may include a sensing element such as a pull-up resistor tied to power source. The fuel container 101 comprises a specific pull down resistor. When the impedance detector 201 comes in contact with the specific pull down resistor on the fuel container 101, a voltage at the meeting point is created. If the voltage does not match the voltage sought by impedance detector 201, the retractable barrier 106 would remain in the closed position. In the event the voltage does match, the retractable barrier 106 would move to an open position.

Figure 3:
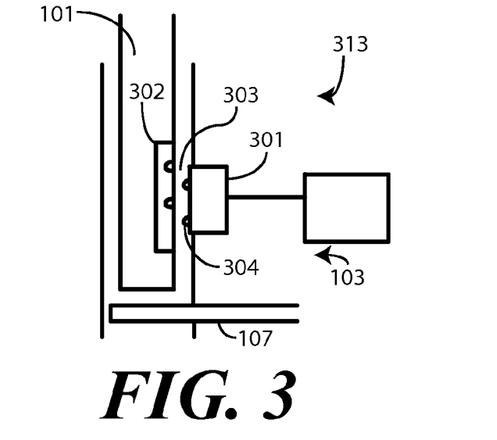
FIG. 3 illustrates one embodiment of an identification sensor comprising a connectivity detector.

Turning now to FIG. 3, the identification sensor 313 comprises a connectivity detector 301. The connectivity detector 301 identifies the fuel container identification 104 by way of a connectivity identifier 302. The connectivity identifier 302 may be a label having apertures therein that expose electrically conductive portions of the fuel container 101. Alternatively, the connectivity identifier 302 may be a label having an electric conductors disposed thereon in a specific pattern. Using electrodes 304 to probe the connectivity identifier 302, the connectivity detector 301 can determine whether the orientation of its electrodes 304 corresponds to the specific pattern of electric surfaces 303 occurring on the connectivity identifier 302. In the event the specific pattern of electric surfaces 303 does not correspond to the orientation of the electrodes 304, the sliding partition 107 would remain in the closed position. In the event the specific pattern of electric surfaces 303 matches the orientation of the electrodes 304, the sliding partition 107 would move to an open position.

Figure 4:
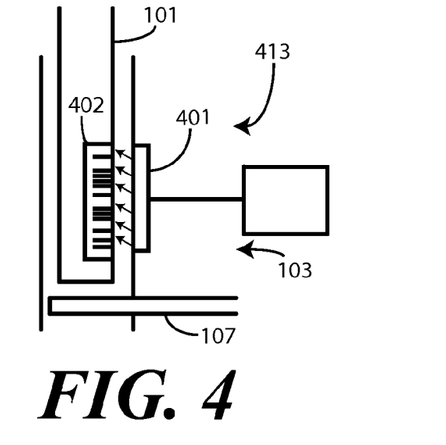
FIG. 4 illustrates one embodiment of an identification sensor comprising a barcode reader.

Briefly turning to FIG. 4, illustrated therein is another embodiment of an identification sensor 413 suitable for use with the invention. The identification sensor 413 comprises a barcode reader 401. The workings of a barcode reader 401 for identification will be clear to those of ordinary skill in the art. The barcode reader 401 reads the fuel container identification barcode 402. The fuel container identification barcode 402 may include different types of information, such as a fuel container manufacturer, a fuel expiration date, a type of fuel container, and a type of fuel.

Figure 5:
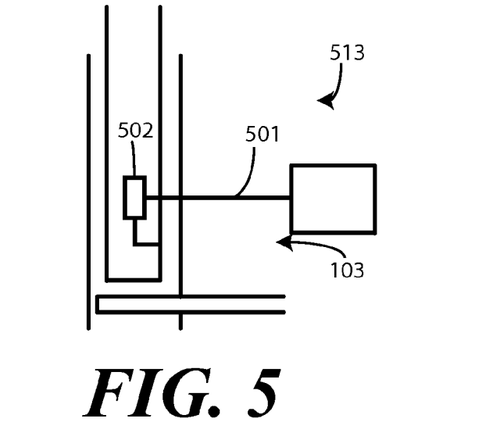
FIG. 5 illustrates one embodiment of an identification sensor comprising a memory reader.

Turning now to FIG. 5, illustrated therein is another embodiment of an identification sensor suitable for use with the invention where identification sensor 513 comprises a memory reader 501. As described in U.S. Pat. No. 5,867,006 to Dias, issued Feb. 2, 1999, entitled "Battery charger," a memory reader 501 may include a one-wire memory such as those made by Dallas Semiconductor Corporation. These devices are programmable semiconductor memories that are accessed using two electrical connections: (1) power/data and (2) ground. Since these are in fact memory devices, they may be used to obtain serial numbers and other information.

In one embodiment, the memory reader 501 may be used to access the fuel container identification 104 where the fuel container identification 104 comprises a memory device 502. Where the memory device 502 indicates that the fuel container 101 is not compatible with the fuel cell (102), the sliding partition 107 would remain in the closed position. Where the memory device 502 indicates that the fuel container 101 is compatible with the fuel cell (102), the sliding partition 107 would move to an open position.

Figure 6:
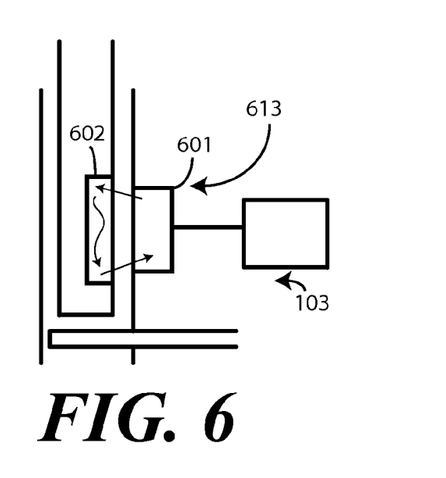
FIG. 6 illustrates one embodiment of an identification sensor comprising a radio-frequency identification device.

Turning now to FIG. 6, illustrated therein is an embodiment of an identification sensor suitable for use with the invention where the identification sensor 613 comprises a radio-frequency identification device 601. Radio-frequency identification technology is well know by those in the art and is taught by U.S. Pat. No. 4,075,632 to Baldwin et al., issued Feb. 21, 1978, entitled "Interrogation, and detection system." The radio-frequency identification device 601 may send a radio wave directed at the fuel container identification 104 where the fuel container identification 104 includes a radio-frequency identification tag 602 and a corresponding radio-frequency identification tag number. The radio-frequency identification tag 602 receives the radio wave and uses it to transmit the radio-frequency identification tag number. In the event the radio-frequency identification tag number identifies a fuel container 101 not compatible with the fuel cell 102, the sliding partition 107 would remain in the closed position. In the event the radio-frequency identification tag number identifies a fuel container 101 compatible with the fuel cell 102, the sliding partition 107 would move to an open position.

Figure 7:
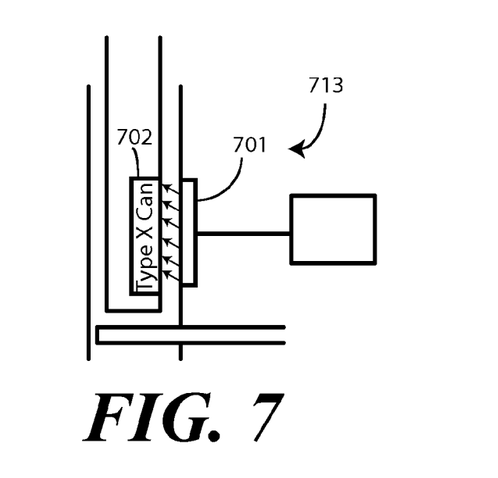
FIG. 7 illustrates one embodiment of an identification sensor comprising a label reader.

Now turning to FIG. 7, illustrated therein is another embodiment of an identification sensor suitable for use with the invention in which the identification sensor 713 comprises a label reader 701. U.S. Pat. No. 6,341,176 to Shirasaki et al., issued Jan. 22, 2002, entitled "Method and apparatus for character recognition" teaches a method and an apparatus for character recognition used when a document, such as a printed document, a hand-written document, or the like, is converted into text data. The label reader 701 may perform this task when reading the fuel container identification 104 where the fuel cell identification includes printed writing or text.

In such an embodiment, the label reader 701 reads the label readable identification 702. In the event the label readable information 702 identifies a fuel container 101 not compatible with the fuel cell 102, the sliding partition 107 would remain in the closed position. In the event the label readable information 702 identifies a fuel container 101 compatible with the fuel cell 102, the sliding partition 107 would move to an open position. The label reader 701 may have the ability to read fuel container identification comprising any combination of the following: a fuel container manufacture, a fuel expiration date, a type of fuel container, and a type of fuel. Additionally, other information may also be included.

Figure 8:
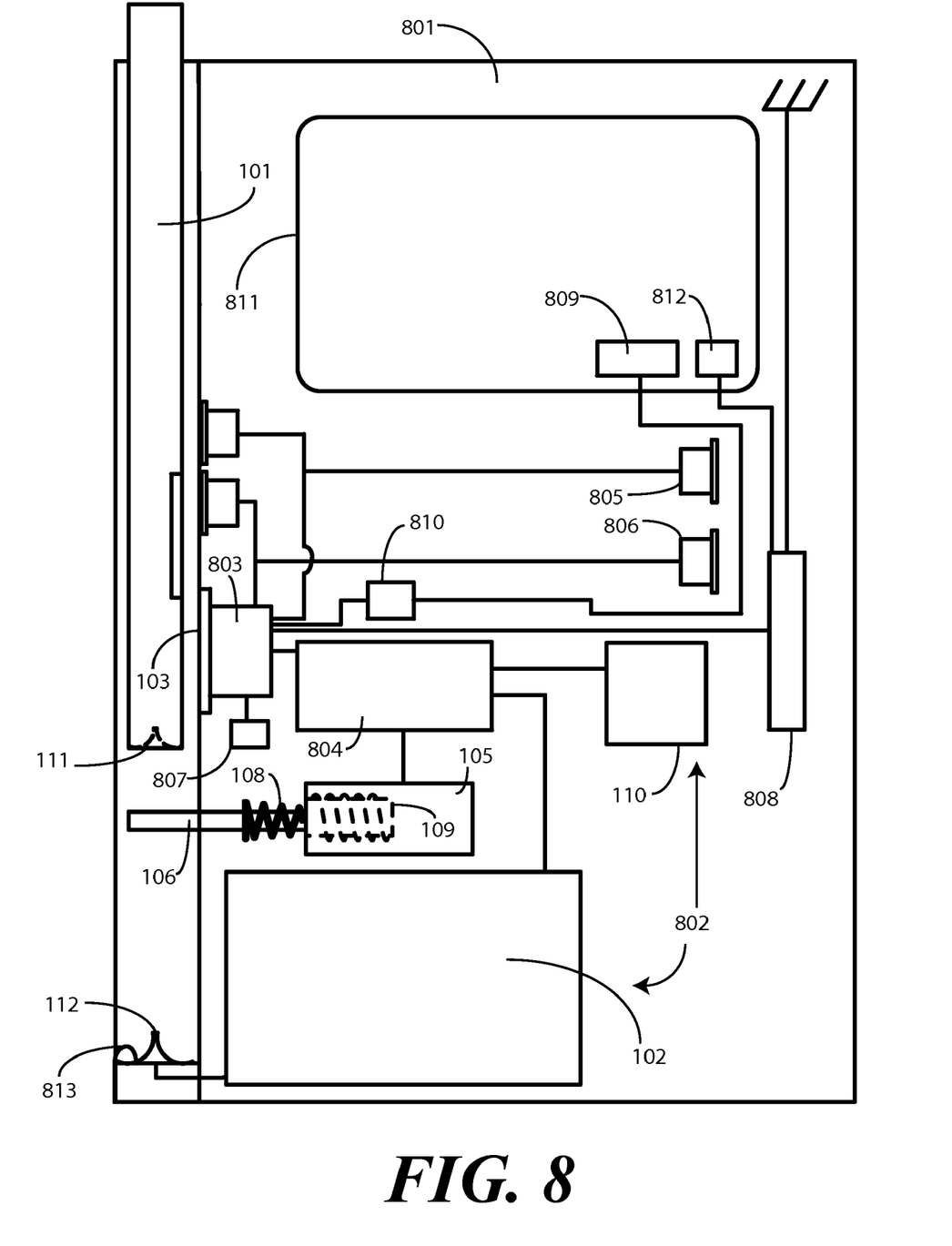
FIG. 8 illustrates one embodiment of a hybrid electronic device.

Turning now to FIG. 8, illustrated therein is one embodiment of a hybrid electronic device 801 having a power source 802 that includes a fuel cell 102 and a battery 110. The fuel cell 102 and battery 110 may be used in tandem to power the hybrid electronic device 801. In one embodiment, the battery is only used when the fuel cell runs out of fuel, or when no fuel is present. In this situation, the battery may be used to power components used to facilitate devices and methods described herein, such as the electromechanical solenoid 109. The fuel cell 102 receives fuel from a fuel input 112. In one embodiment, the fuel input 112 is an interface having an opening for fuel to flow from a fuel container 101 into the fuel cell 102.

The hybrid electronic device 801 includes a fuel container identification device 103 for identifying fuel containers that are compatible with the fuel cell 102. In one embodiment, the fuel container identification device 103 includes a control circuit 803. The control circuit 803 may receive information from the fuel container identification device 103 relating to the fuel container. Based on the content of the received information, the control circuit 803 may send signals to other components within the hybrid electronic device 801 with instructions on how to perform.

In one embodiment, the control circuit 803 may be used to communicate with a barrier retractor 804. The barrier retractor 804 is a device capable of imbuing a force on an object. Such devices capable of imbuing a force on an object include solenoids, electric motors and hydraulic motion systems. In one embodiment, the barrier retractor 804 comprises an electromechanical solenoid 109. The electromechanical solenoid 109 uses a magnetic force, induced by electrifying a plurality of wire loops, to control the motion of a magnetic metal rod. Based on the direction of the magnetic field, the metal rod moves in respective relation to the electromechanical solenoid 109.

A retractable barrier 106 is operable with the barrier retractor 804. In one embodiment, the retractable barrier 106 is a rigid barrier shaped to prevent any access to the fuel input 112 when closed. The rigid barrier may be manufactured from a variety of substantially impervious materials including plastics, metals, ceramics and organic materials. Access to the fuel input 112 is granted when the retractable barrier 106 is moved to an open position by the barrier retractor 804.

In one embodiment, the barrier retractor 804 moves the retractable barrier 106 to an open position when the fuel container identification device 103 identifies a fuel container 101. By way of example, the fuel container 101 is first inserted into the hybrid electronic device 801. For this example, the fuel container identification device 103 comprises a barcode reader (401) and correspondingly, the fuel container identification 104 is a fuel container identification barcode (402). The fuel container 101 is initially blocked from gaining access to the fuel input 112 by the retractable barrier 106 being biased in a closed position. The barcode reader (401) reads the fuel container identification barcode (402) located on the fuel container 101. The barcode reader (401) sends the retrieved data from the fuel container identification barcode (402) to the control circuit 803. The control circuit 803 analyzes the retrieved data to see if it corresponds to compatible fuel usable with the fuel cell 102. If the fuel within the fuel container 101 is deemed compatible by the control circuit 803, the control circuit 803 directs the barrier retractor 804 to bias the retractable barrier 106 in an open position. Upon the retractable barrier 106 being biased in an open position, the fuel container can access the fuel input 112 and commence supplying the fuel cell 102 with fuel.

To conserve battery power, in one embodiment, the barrier retractor 804 may further be loaded with a spring 108. To allow access only when the retractable barrier 106 is opened by the barrier retractor 804, the spring 108 may load the retractable barrier 106 in a closed position when the gating engine 105 is inactive. As such, the only time the retractable barrier 106 is open is when the barrier retractor 804 is active.

As described above in FIGS. 2, 3, 4, 5, 6, and 7, the fuel container identification device 103 may be any of an impedance detector 201, a connectivity detector 301, a barcode reader 401, a memory reader 501, a radio-frequency identification device 601, or a label reader 701. Additionally, other types of fuel container identification devices will be obvious to those of ordinary skill in the art. Designers have a large flexibility in choosing which fuel identification sensor to use. These decisions might be based upon, but not limited to, device housing size, device power requirements, already in use fuel container identification systems, and the sensing environment.

In one alternative embodiment of the invention, a temperature sensor 805 is coupled to the control circuit 803. The temperature sensor 805 may be configured to prevent the barrier retractor 804 from moving the retractable barrier 106 to an open position when the temperature sensor 805 detects an unacceptable temperature of either the fuel container 101, the hybrid electronic device 801, or the fuel cell 102. For example, in a hot environment, it may be undesirable to connect a fuel container to the fuel cell when fuel stored in the fuel container 101 and the fuel cell 102 would react unfavorably. Thus, in one embodiment, the control circuit 803 prevents the barrier retractor 804 from opening the retractable barrier 106 when the temperature sensor 805 detects that a temperature associated with the fuel cell 102 or the fuel container 101 exceeds a predetermined temperature threshold.

Alternatively, because fuel cells use reformers to breakdown fuel into elements usable in producing energy, the reformers may need to be maintained above a certain temperature. If the environment is too cold, it may inhibit the reformers from breaking down the fuel; such instance would require a low-end temperature threshold to be maintained. In one embodiment, the control circuit 803 prevents the barrier retractor 804 from opening the retractable barrier 106 when the temperature sensor 805 detects that a temperature associated with the fuel cell 102 or the fuel container 101 that is lower than a predetermined temperature threshold.

In another embodiment of the invention, a moisture sensor 806 is coupled to the control circuit 803. The moisture sensor 806 may be configured to prevent the barrier retractor 804 from moving the retractable barrier 106 to an open position upon sensing moisture in excess of a predetermined moisture threshold. For example, in a highly humid environment, water particles might reside on the fuel container 101. These water particles when in contact with the fuel input 112 may damage, or otherwise contaminate the fuel cell. Further, the moisture sensor 806 may also detect moisture residing within the hybrid electronic device. By way of an example, if the fuel cell is flooded with excess fuel, it may be inadvisable to add additional fuel to the fuel cell 102. The moisture sensor 806, upon sensing the moisture in the form of flooded fuel, would inform the control circuit 803. The control circuit 803 in turn would keep the retractable barrier 106 biased in a closed position thereby restricting access to the fuel input 112. This predetermined moisture threshold might be set to a moisture amount wherein fuel stored in the fuel container 101 and the fuel cell 102 would react unfavorably if in contact with the moisture.

One embodiment of the invention further comprises a touch sensor 813 attached to the fuel input 112, whereupon being actuated when the fuel container 101 couples with the fuel input 112. The actuation of this touch sensor 813, which is coupled to the control circuit 803, causes the retractable barrier 106 to become biased in a closed position, for example, once the fuel container 101 has been identified and the retractable barrier 106 becomes biased in an open position allowing access to the fuel input 112. Once the fuel container couples with the fuel input 112, the touch sensor 813 is actuated and causes the retractable barrier 106 to become biased in a closed position. This embodiment limits the amount of time the retractable barrier 106 is left biased in the open position.

There are many benefits of limiting the time the retractable barrier 106 is allowed to remain biased in the open position. One benefit is that of saving energy. By way of example, the barrier retractor 804 may comprise the electromechanical solenoid 109. When a fuel container 101 is identified, power is sent to the electromechanical solenoid 109 to bias the retractable barrier 106 in an open position. Continuous power must be supplied to the electromechanical solenoid 109 in order to keep the retractable barrier 106 biased in the open position. The use of a touch sensor 813 limits the amount of energy used to power the electromechanical solenoid 109 by closing the retractable barrier 106 after a coupling has been achieved.

In one embodiment, the control circuit 803 comprises a timer 807. The timer 807 provides a temporal relation to the process of allowing the fuel container 101 access to the fuel cell 102. The timer 807 may be configured to actuate upon the barrier retractor 804 causing the retractable barrier 106 to move from the closed position to the open position. This actuation might be caused by the fuel container identification device 103 identifying a fuel container 101 and providing the fuel container 101 with access to the fuel input 112. In one embodiment, upon expiration of the timer 807, the barrier retractor 804 might be configured to cause the retractable barrier 106 to move from an open position to a closed position. The timer 807 further limits the time the retractable barrier 106 is biased in the open position.

An additional benefit of a timer can be illustrated in the case of a fuel container being identified and then immediately removed when only using a touch sensor 813 to close the retractable barrier 106 as described above. Once the fuel container 101 is identified the retractable barrier 106 is opened, it remains open since the fuel container is removed without making contact with the touch sensor. The retractable barrier 106 being biased in the open position without a coupled fuel container may allow debris to deposit on the fuel input 112, possibly causing contamination. The use of a timer 807 would therefore limit the amount of time the fuel input 112 would be accessible to debris and other foreign materials. As described above the timer 807 is actuated upon the retractable barrier 106 opening and would close the retractable barrier 106 after the timer 807 expires with no consideration of fuel container 101 fuel cell 102 coupling.

Figure 10:
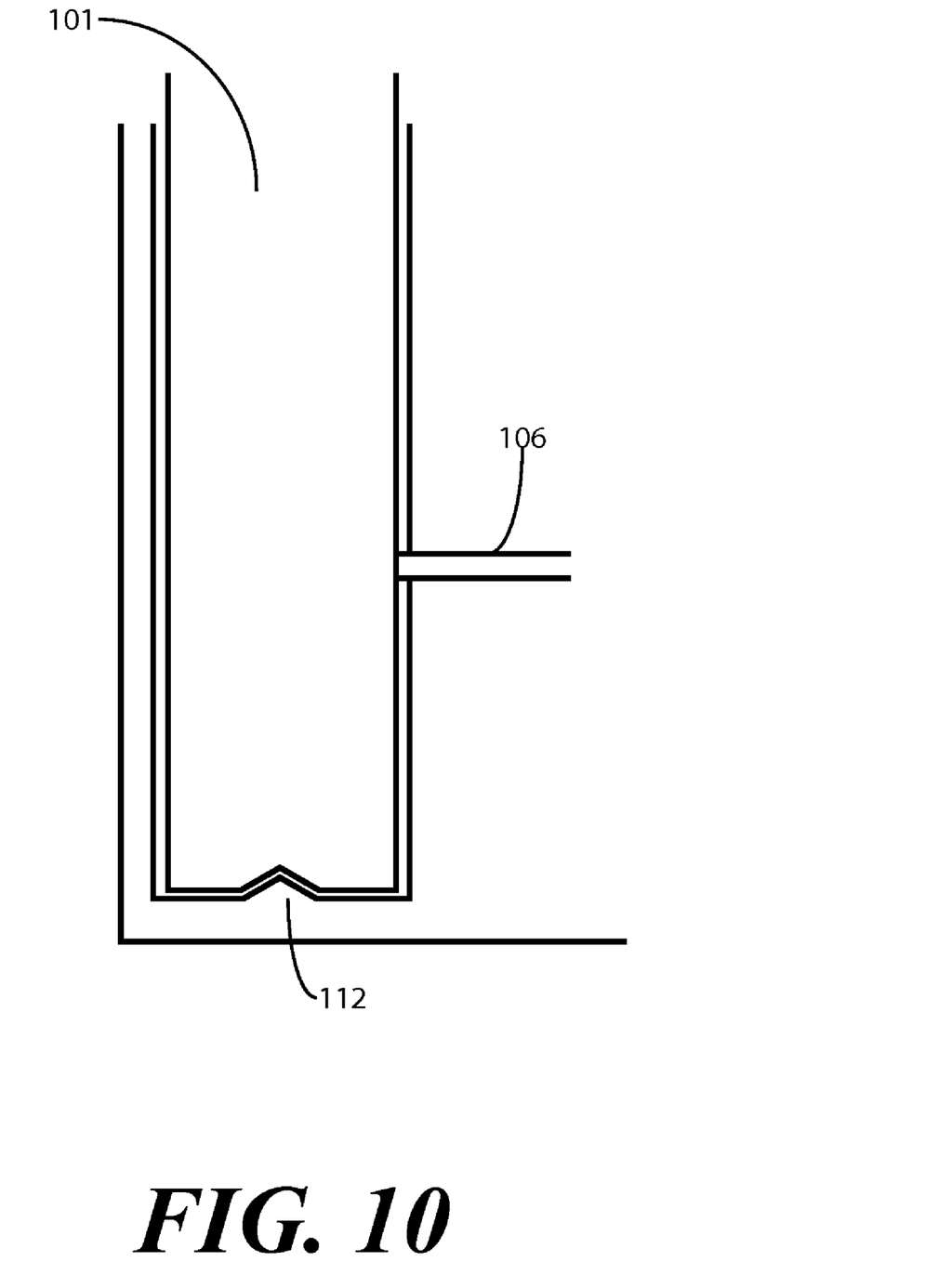
FIG. 10 illustrates one embodiment of the invention where the retractable barrier is in a partially closed position.

Turning briefly to FIG. 10, illustrated therein is one embodiment of the invention where the fuel container 101 is in contact with the fuel input 112 and may be refueling the fuel cell 102. The embodiment illustrated in FIG. 10 further shows the retractable barrier 106 in a partially closed position, biased against the fuel container 101 following the expiration of the timer (807). In the event of the fuel container 101 being removed from the hybrid electronic device 801, more specifically ending contact between the fuel container 101 and the retractable barrier 106, the retractable barrier 106 may move to a fully closed position, as shown in FIG. 8.

Referring again to FIG. 8, one embodiment, the hybrid electronic device 801 comprises a communication circuit 808 coupled to the control circuit 803. The communication circuit 808 may be configured to, upon the fuel container identification device 103 failing to identify the fuel container 101, provide a fuel container notification 809 to a user, a service supplier, or a manufacturer. The communication circuit may not only provide fuel container notification locally, but may also send out the fuel container notification 809 to a remote destination. Communication with a remote user might be desirable in collecting statistics on fuel cell compatibility, type of fuel cells being used, and reasons of incompatibility.

By way of example, where the fuel container 101 is not identified by the fuel container identification device 103, this is communicated with the control circuit 803. The control circuit 803 then lets the communication circuit 808 know of an unidentifiable fuel container and proceeds to send the communication circuit 808 any additional data sent by the fuel container identification device 103 concerning the fuel container 101, such as manufacturer, expiration date, and other fuel container properties. Upon receiving notification of an unidentifiable fuel container, the communication circuit 808 sends the fuel container notification 809 to a display 811 comprised within the hybrid electronic device 801. The fuel container notification may be shown on the display 811 in the form of a message stating "Error in Identifying Fuel Container."

In one embodiment of the invention, the hybrid electronic device 801 comprises a maintenance timer 810. For instance, the maintenance timer 810 might be configured to determine a number of retractable barrier openings. Monitoring the number of times the retractable barrier 106 opens may be desired to provide a maintenance notification 812 to a user upon the number of retractable barrier openings exceeding a predetermined barrier opening threshold. The predetermined number of barrier openings threshold may be a number of retractable barrier openings which correspond to the hybrid electronic device 801 requiring maintenance. This maintenance notification 812 may be presented to the user on the display 811. By way of example, a maintenance notification upon the number of retractable barrier openings exceeding the predetermined barrier opening threshold might comprise the message "Maintenance Required."

Figure 9:
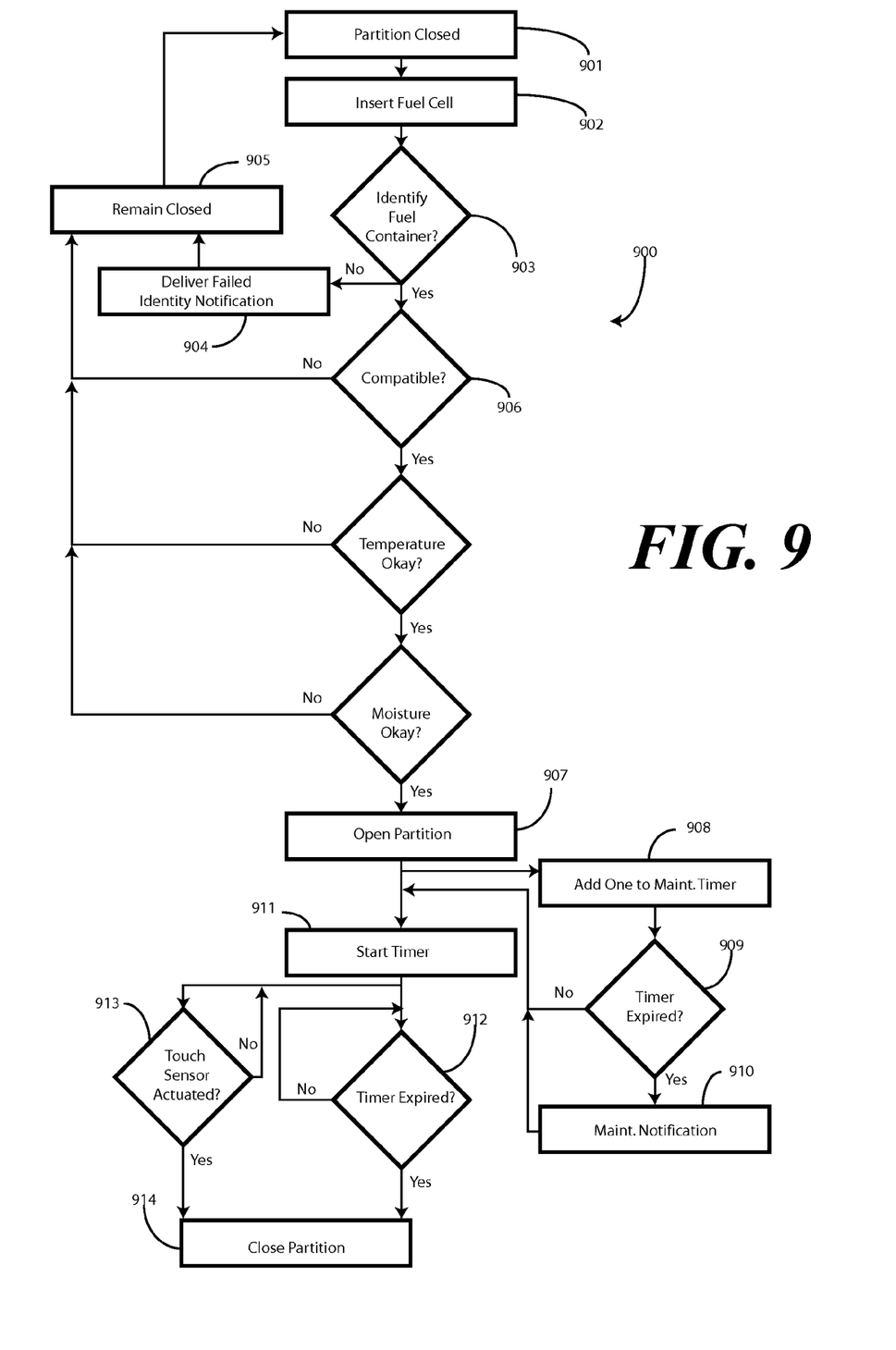
FIG. 9 illustrates a method 900 of determining whether a fuel container is compatible with an electronic device.

Turning now to FIG. 9, illustrated therein is one embodiment of a method 900 of determining whether a fuel container is compatible with an electronic device in accordance with the invention. The initial state of the device, at step 901, provides a retractable barrier disposed in a closed position. With the retractable barrier is disposed in a closed position, contact with the fuel cell input is prohibited, thereby protecting it from contamination.

At step 902, a fuel container is inserted into a fuel opening an electronic device. Upon insertion, as the retractable barrier is closed, the fuel container may only travel in until it contacts the closed barrier. Once inserted, the electronic device attempts to identify the fuel container, at decision 903. If the fuel container is not recognized, in one embodiment, at step 904 a notification is sent to a user explaining that the fuel container could not be identified. Following the notification, at step 905, the retractable barrier remains disposed in a closed position.

If however the fuel container is identified, verification that the fuel container is compatible with the electronic device may be performed at decision 906. In one embodiment, the step of determining compatibility includes a test determining whether the fuel contained in the fuel container is compatible with the fuel cell disposed within the electronic device.

In one embodiment, the step of determining compatibility may include a temperature verification. This verification involves measuring a temperature, wherein the compatibility test is overcome if the temperature is above or below a predetermined temperature threshold. The temperature measured in this test can include temperature of the fuel container, the fuel, the fuel cell, or the electronic device.

In another embodiment, the step of determining compatibility may include a moisture compatibility test. By way of example, a moisture detector may detect an amount of moisture present upon the fuel container or within the electronic device. If, for example, the moisture detected is below a predetermined moisture threshold, the fuel container may be deemed compatible with the electronic device.

Another embodiment of compatibility test may optionally be used to verify that the fuel container is compatible with the electronic device. In one embodiment, compatibility is determined by performing a temporal test on the fuel container. A temporal characteristic may be any type of time-based information relating to the fuel container, including for example an expiration date or warranty period. This compatibility test may determine whether the temporal characteristic of the fuel container is with a predetermined time of use window. For example, a control circuit in the device may test to determine if the current date is beyond the expiration date of the fuel container. If the temporal characteristic is within the predetermined time of use window, the container may be deemed compatible with the device. It will be clear to those of ordinary skill in the art having the benefit of this disclosure that other compatibility tests may also employed without departing from the scope and spirit of the invention. Other exemplary compatibility tests used to determine the whether a fuel container is compatible with an electronic device might include a coupling interface test, a pressure test, a size test, and other such tests. Further, the various compatibility tests may be used in different combinations depending upon design choice and application. Some devices may employ three or four compatibility tests, while other devices may employ only one or two.

If any combination of the above tests fails, the fuel container may be deemed incompatible with the device. Thus, the retractable barrier remains closed. Where the employed combination of tests is passed, the fuel container may be deemed compatible and the retractable barrier opened at step 907, thus giving the fuel container access to the fuel input. Once the retractable barrier is opened, the maintenance timer may be incremented at step 908.

Where a maintenance timer is employed, at decision 909 the maintenance timer is compared to a predetermined barrier opening threshold. If the maintenance timer is within the predetermined barrier opening threshold, the method continues directly to step 911. If the maintenance timer exceeds the predetermined barrier opening threshold, a notification may be sent to a user explaining that the electronic device is in need of maintenance at step 910. In one embodiment, once the notification is sent, the retractable barrier is closed, and will remain so until maintenance is preformed.

Following the retractable barrier being biased in an open position there are many optional steps that attend to the step of biasing the retractable barrier in a closed position. In one embodiment, at step 911, a timer is initialized in response to the opening of the retractable barrier. The retractable barrier remains open until the timer expires, as determined at decision 912. Once the timer has expired, the retractable barrier is closed at step 914. Closing the timer after a set time period may decrease the chance of foreign materials accessing the fuel input. Where the timer expires and the fuel container is inserted into the electronic device, the retractable barrier disposed in a closed position resting against the fuel container. Once the fuel container is removed, the retractable barrier moves to a full closed position.

A further embodiment on biasing the retractable barrier in a closed position is that of using a touch switch. The touch switch may be located on the fuel input and actuated upon the fuel container making contact with the fuel input. The retractable barrier remains biased in an open position until the touch sensor is actuated at step 913. Once the touch sensor is actuated, the retractable barrier is closed at step 914. As stated above, the use of a touch sensor decreases the amount of time the retractable barrier is left biased in an open position, and thus decreases power consumption as well as probability of debris contamination.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention.

What is claimed is:

1. A gating device for controlling coupling of a fuel container with a fuel cell, the gating device comprising:
   a. a fuel container identification device;
   b. a gating engine coupled to the fuel container identification device; and
   c. a retractable barrier coupled to the gating engine;
   wherein upon the fuel container identification device recognizing the fuel container, the gating engine opens the retractable barrier.

2. The gating device of claim 1, wherein the retractable barrier comprises a sliding partition.

3. The gating device of claim 2, wherein the sliding partition is spring loaded so as to be disposed in a closed position when the gating engine is inactive.

4. The gating device of claim 1, wherein the gating engine comprises an electromechanical solenoid.

5. The gating device of claim 1, wherein the fuel container identification device comprises an identification device selected from the group consisting of bar code readers, radio-frequency identification devices, impedance detectors, memory readers, label readers, and connectivity detectors.

6. A hybrid electronic device, comprising:
   a. a power source comprising at least a fuel cell and a battery;
   b. a fuel input coupled to the fuel cell;
   c. a fuel container identification device comprising a control circuit;
   d. a barrier retractor coupled to the fuel container identification device; and
   e. a retractable barrier coupled to the barrier retractor, the retractable barrier blocking access to the fuel input when in a closed position;
   wherein the barrier retractor is configured, upon the fuel container identification device identifying a fuel container, to cause the retractable barrier to move from the closed position to an open position, thereby allowing access to the fuel input.

7. The hybrid electronic device of claim 6, further comprising a temperature sensor coupled to the control circuit, wherein when the temperature sensor is configured to, upon sensing a temperature exceeding a predetermined temperature threshold, prevent the barrier retractor from opening of the retractable barrier.

8. The hybrid electronic device of claim 6, further comprising a moisture sensor coupled to the control circuit, wherein when the moisture sensor is configured to, upon sensing moisture above a predetermined moisture threshold, prevent the barrier retractor from opening of the retractable barrier.

9. The hybrid electronic device of claim 6, wherein the retractable barrier is spring loaded so as to be biased at rest in the closed position.

10. The hybrid electronic device of claim 6, wherein the control circuit comprises a timer configured to actuate upon the barrier retractor causing the retractable barrier to move from the closed position to the open position, and upon expiration of the timer, the barrier retractor being configured to cause the retractable barrier to move from the open position to the closed position.

11. The hybrid electronic device of claim 6, further comprising a communication circuit coupled to the control circuit, wherein the communication circuit is configured to, upon the fuel container identification device failing to identify the fuel container, provide a fuel container notification to one of a user, a service supplier, or a manufacturer.

12. The hybrid electronic device of claim 6, further comprising a maintenance timer configured to determine a number of retractable barrier openings, and upon the number of retractable barrier openings exceeding a predetermined barrier opening threshold, provide a notification to one of a user, a service supplier, or a manufacturer.

13. The hybrid electronic device of claim 6, wherein the fuel container identification device comprises one of a bar code reader, a radio-frequency identification device, an impedance detector, a memory reader, a label reader, or a connectivity detector.

14. The hybrid electronic device of claim 6, wherein the barrier retractor comprises an electromechanical solenoid.

* * * * *